(12) United States Patent
Otsuki et al.

(10) Patent No.: US 10,787,950 B2
(45) Date of Patent: Sep. 29, 2020

(54) HEAT INSULATING PIPE SYSTEM AND PROCESSING SYSTEM

(71) Applicant: Tokyo Electron Limited, Tokyo (JP)

(72) Inventors: Kohei Otsuki, Miyagi (JP); Akiyoshi Mitsumori, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 45 days.

(21) Appl. No.: 16/267,487

(22) Filed: Feb. 5, 2019

(65) Prior Publication Data
US 2019/0242289 A1    Aug. 8, 2019

(30) Foreign Application Priority Data

Feb. 7, 2018 (JP) ................................. 2018-020307

(51) Int. Cl.
| | |
|---|---|
| *F28F 27/00* | (2006.01) |
| *F01N 13/14* | (2010.01) |
| *F16L 59/14* | (2006.01) |
| *F16L 59/02* | (2006.01) |
| *F16L 9/18* | (2006.01) |
| *F16L 59/065* | (2006.01) |
| *F01N 13/16* | (2010.01) |
| *F16L 58/00* | (2006.01) |
| *F16L 9/06* | (2006.01) |

(52) U.S. Cl.
CPC ............ *F01N 13/148* (2013.01); *F16L 9/18* (2013.01); *F16L 59/02* (2013.01); *F16L 59/065* (2013.01); *F16L 59/14* (2013.01); *F16L 59/143* (2013.01); *F01N 13/16* (2013.01); *F01N 2260/08* (2013.01); *F01N 2260/20* (2013.01); *F16L 9/06* (2013.01); *F16L 58/00* (2013.01)

(58) Field of Classification Search
CPC . F16L 9/18; F16L 59/02; F16L 59/065; F16L 59/14; F16L 59/143; F16L 9/06; F16L 58/00; F01N 13/148; F01N 13/16; F01N 2260/20
USPC .......................................... 165/200
See application file for complete search history.

(56) References Cited

U.S. PATENT DOCUMENTS 3,786,878 A * 1/1974 Chapman ................ E21B 17/18
                                                            175/320
2014/0144539 A1* 5/2014 Niwa ..................... F16L 59/029
                                                            138/149

FOREIGN PATENT DOCUMENTS

JP    H03-041297 A1    2/1991
KR    10-2004-0032168 A    4/2004

* cited by examiner

*Primary Examiner* — Davis D Hwu
(74) *Attorney, Agent, or Firm* — Pearne & Gordon LLP

(57) ABSTRACT

A processing system 100 includes a heat insulating pipe 12, a temperature measuring device 19, and a control device 20. The heat insulating pipe 12 has an inner pipe and an outer pipe. An airtight space is formed between the inner pipe and the outer pipe. A fluid having a temperature lower than that of an indoor space in which the heat insulating pipe 12 is placed is flown within the inner pipe. The temperature measuring device 19 measures a temperature of a surface of the heat insulating pipe 12. The control device 20 is controls a pressure within the airtight space by controlling an exhaust device 16 configured to exhaust a gas within the airtight space based on the temperature of the surface of the heat insulating pipe 12 and a dew-point temperature calculated from a humidity and the temperature of the indoor space.

17 Claims, 11 Drawing Sheets

| TEMPERATURE OF INDOOR SPACE (°C) | DEW-POINT TEMPERATURE WITH RESPECT TO RELATIVE HUMIDITY (°C) | | | | | |
|---|---|---|---|---|---|---|
| | 45% | 50% | 55% | 60% | 70% | 75% |
| 30 | 16.8 | 18.4 | 20.0 | 21.4 | 23.9 | 25.1 |
| 29 | 15.9 | 17.5 | 19.0 | 20.4 | 23.0 | 24.1 |
| 28 | 15.0 | 16.6 | 18.1 | 19.5 | 22.0 | 23.2 |
| 27 | 14.1 | 15.7 | 17.2 | 18.6 | 21.1 | 22.2 |
| 26 | 13.2 | 14.8 | 16.3 | 17.6 | 20.1 | 21.2 |
| 25 | 12.2 | 13.9 | 15.3 | 16.7 | 19.1 | 20.3 |
| 24 | 11.3 | 12.9 | 14.4 | 15.8 | 18.2 | 19.3 |
| 23 | 10.4 | 12.0 | 13.5 | 14.8 | 17.2 | 18.3 |
| 22 | 9.5 | 11.1 | 12.5 | 13.9 | 16.3 | 17.4 |
| 21 | 8.6 | 10.2 | 11.6 | 12.9 | 15.3 | 16.4 |
| 20 | 7.7 | 9.3 | 10.7 | 12.0 | 14.4 | 15.4 |
| 19 | 6.8 | 8.3 | 9.8 | 11.1 | 13.4 | 14.5 |
| 18 | 5.9 | 7.4 | 8.8 | 10.1 | 12.5 | 13.5 |
| 17 | 5.0 | 6.5 | 7.9 | 9.2 | 11.5 | 12.5 |
| 16 | 4.1 | 5.6 | 7.0 | 8.2 | 10.5 | 11.6 |
| 15 | 3.2 | 4.7 | 6.1 | 7.3 | 9.6 | 10.6 |
| 14 | 2.3 | 3.7 | 5.1 | 6.4 | 8.6 | 9.6 |
| 13 | 1.3 | 2.8 | 4.2 | 5.5 | 7.7 | 8.7 |
| 12 | 0.4 | 1.9 | 3.2 | 4.5 | 6.7 | 7.7 |
| 11 | -0.4 | 1.0 | 2.3 | 3.5 | 5.8 | 6.7 |
| 10 | -1.2 | 0.1 | 1.4 | 2.6 | 4.8 | 5.8 |

HEAT INSULATING PIPE SYSTEM AND PROCESSING SYSTEM

CROSS-REFERENCE TO RELATED APPLICATION

This application claims the benefit of Japanese Patent Application No. 2018-020307 filed on Feb. 7, 2018, the entire disclosure of which is incorporated herein by reference.

TECHNICAL FIELD

The various aspects and embodiments described herein pertain generally to a heat insulating pipe system and a processing system.

BACKGROUND

In case of controlling a temperature of a target apparatus by a heat medium, a heat insulator may be wound around a pipe through which the heat medium is flown between the target apparatus and a temperature control apparatus configured to control a temperature of the heat medium. The more the temperature of the heat medium deviates from a room temperature, the thicker the heat insulator needs to be. As a result, a diameter of the pipe is increased, making it difficult to place the pipe in a narrow space. As a resolution, there may be used a heat insulating pipe having a vacuum space between an inner pipe and an outer pipe. This heat insulating pipe includes a flexible pipe having an inner pipe and an outer pipe which are composed of a metal bellows.

In the heat insulating pipe, however, it is difficult to set up a configuration in which the space between the inner pipe and the outer pipe are hermetically sealed completely. Besides, a gas is discharged from the inner pipe or the outer pipe. As a result, a vacuum degree in the space between the inner pipe and the outer pipe is deteriorated with a lapse of time. Though a gas adsorbent may be used to maintain the vacuum degree, there is a limit in an adsorption amount. Consequently, heat insulation property of the heat insulating pipe is degraded with the lapse of time. To avoid this problem, there is known a technique of measuring a pressure of the space between the inner pipe and the outer pipe and re-exhausting the gas within the space between the inner pipe and the outer pipe based on the measured pressure (see, for example, Patent Document 1).

Patent Document 1: Japanese Patent Laid-open Publication No. H03-041297

However, in case of flowing into the heat insulating pipe a fluid, as the heat medium, having a temperature lower than a temperature of an indoor space in which the heat insulating pipe is placed (hereinafter, sometimes referred to as "room temperature"), when the heat insulation property of the heat insulating pipe is low, the temperature of the low-temperature fluid may be transferred to a surface of the heat insulating pipe, so that condensation is generated on the surface of the heat insulating pipe. If the condensation on the heat insulating pipe takes place, an electronic device constituting a semiconductor processing apparatus may be abnormally operated or broken due to moisture flowing from the surface of the heat insulating pipe.

Further, if the heat insulating pipe is bent when it is used, there may exists a place where a distance between the inner pipe and the outer pipe is shortened. The heat insulation property may be deteriorated at this place. Thus, even if the pressure within the space between the inner pipe and the outer pipe is of a value at which the enough heat insulation property not to cause the condensation on the surface of the heat insulating pipe can be maintained while the heat insulating pipe is not bent, the condensation on a part of the surface of the heat insulating pipe may be generated if the heat insulating pipe is bent. Therefore, it is difficult to suppress the condensation on the surface of the heat insulating pipe just by monitoring the pressure within the space between the inner pipe and the outer pipe.

SUMMARY

In an exemplary embodiment, a heat insulating pipe system includes a heat insulating pipe, a measuring unit, and a control unit. The heat insulating pipe has an inner pipe and an outer pipe. An airtight space is formed between the inner pipe and the outer pipe. A fluid having a temperature lower than a temperature of an indoor space in which the heat insulating pipe is placed is flown within the inner pipe. The measuring unit is configured to measure a temperature of a surface of the heat insulating pipe. The control unit is configured to control a pressure within the airtight space by controlling an exhaust device configured to exhaust a gas within the airtight space based on the temperature measured by the measuring unit and a dew-point temperature calculated from a humidity and the temperature of the indoor space in which the heat insulating pipe is placed.

According to the various aspects and exemplary embodiments of the present disclosure, it is possible to suppress the condensation on the surface of the heat insulating pipe.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 6 is a diagram showing an example of a dew-point temperature table;

DETAILED DESCRIPTION

Figure 1:
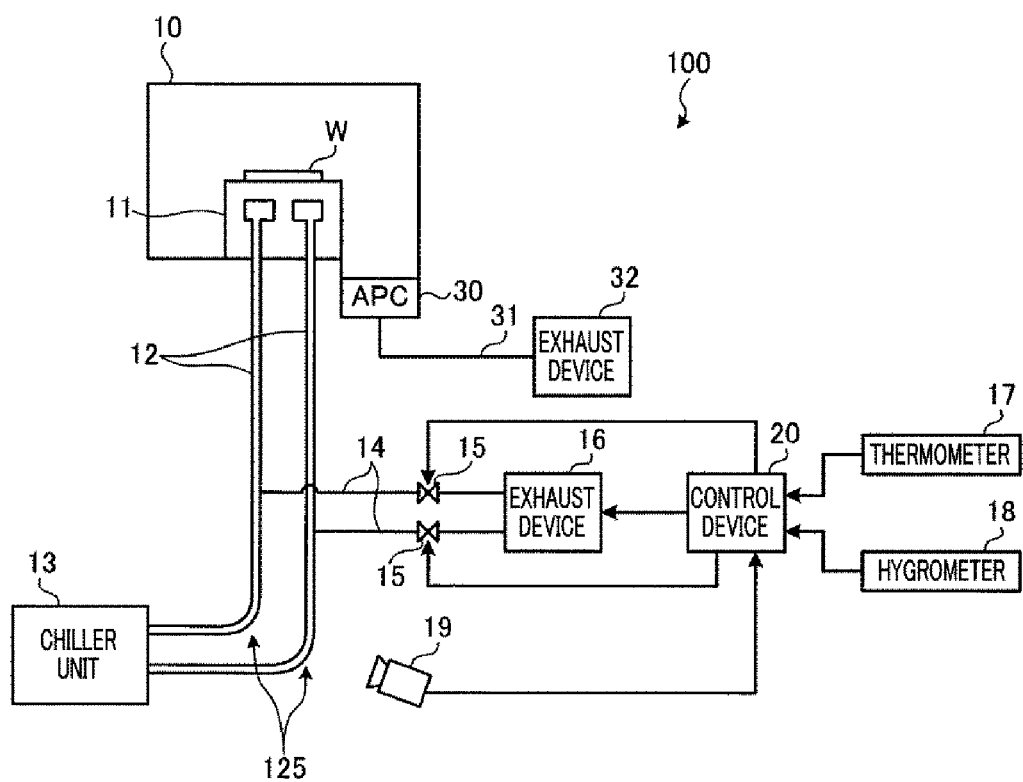
FIG. 1 is a diagram schematically illustrating an example of a processing system according to a first exemplary embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Now, exemplary embodiments of a heat insulating pipe system and a processing system of the present disclosure will be described in detail with reference to the accompanying drawings. Further, it should be noted that the exemplary embodiments do not limit the heat insulating pipe system and the processing system of the present disclosure.

First Exemplary Embodiment

[Configuration of Processing System 100]

FIG. 1 is a diagram schematically illustrating an example of a processing system 100 according to a first exemplary embodiment. The processing system 100 is equipped with a processing chamber 10, a plurality of heat insulating pipes 12 and a chiller unit 13. An exhaust device 32 is connected via an APC (Automatic Pressure controller) 30 and an exhaust line 31 to this processing chamber 10 which is hermetically sealed. By adjusting a degree of openness of the APC 30 while exhausting a gas within the processing chamber 10 by the exhaust device 32, the inside of the processing chamber 10 is regulated to a preset pressure.

Further, a stage 11 configured to place a wafer W thereon is provided within the processing chamber 10. A path through which a coolant is flown is formed within the stage 11. The path within the stage 11 is connected to a chiller unit 13 via the plurality of heat insulating pipes 12. The chiller unit 13 supplies the coolant controlled to have a required temperature into the path within the stage 11 to be circulated therein through the individual heat insulating pipes 12. Thus, a temperature of the wafer W placed on the stage 11 is regulated to a required temperature. The wafer W is an example of a processing target substrate. The stage 11 is an example of a heat exchanging member. The chiller unit 13 is an example of a supply device.

Depending on the arrangement of the processing chamber 10 and the chiller unit 13, at least a part of the heat insulating pipes 12 is bent when it is used. In the following, a bent portion of the heat insulating pipe 12 will be referred to as a curved portion 125.

Figure 2:
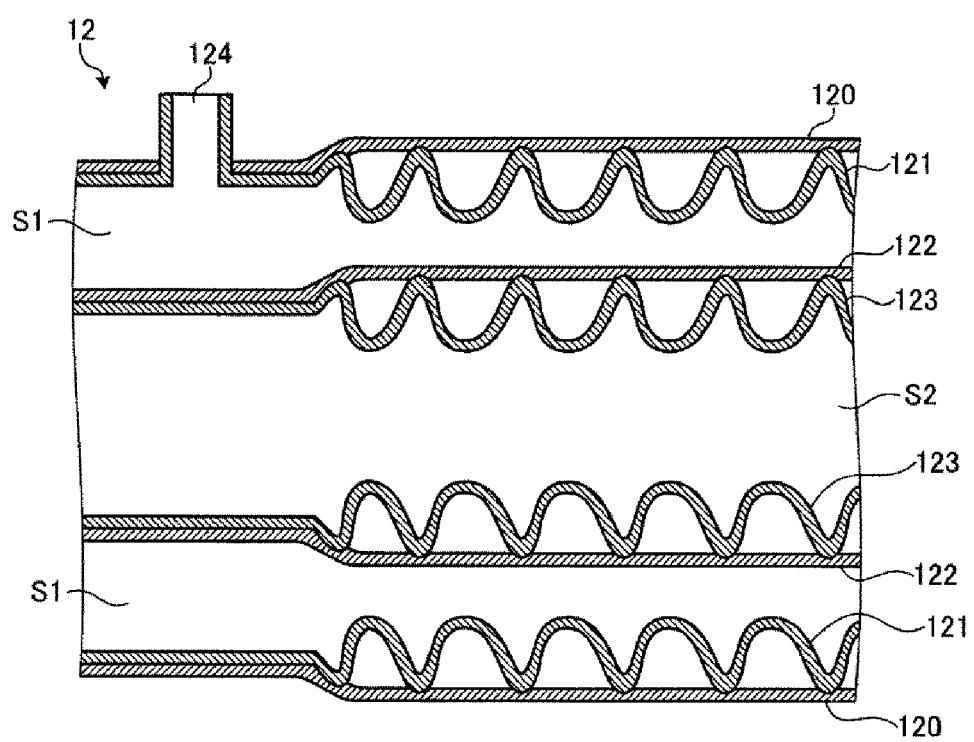
FIG. 2 is a cross sectional view illustrating an example of a heat insulating pipe.

The heat insulating pipe 12 is a dual pipe having an outer pipe 121 and an inner pipe 123 as depicted in FIG. 2, for example. FIG. 2 is a cross sectional view illustrating an example of the heat insulating pipe 12. The outer pipe 121 and the inner pipe 123 are made of a metal such as stainless steel, and at least a part of each pipe is made of a bellows so that the pipes 121 and 123 can be bent. The coolant having a temperature controlled by the chiller unit 13 is flown in a space S2 within the inner pipe 123. The chiller unit 13 controls the temperature of the coolant to be lower than a temperature of an indoor space in which the heat insulating pipe 12 is placed. The temperature of the indoor space in which the heat insulating pipe 12 is placed is a temperature of a clean room in which the processing system 100 is placed. For example, this temperature may be in a range from, e.g., 20° C. to 26° C. Further, the temperature of the coolant controlled by the chiller unit 13 may be equal to or less than, e.g., 0° C.

A space S1 is formed between the outer pipe 121 and the inner pipe 123, and the outer pipe 121 is provided with an exhaust port 124 communicating with the space S1. A protection member 120 is wound on an outer surface of the outer pipe 121, and a heat insulator 122 is wound on an outer surface of the inner pipe 123. As a gas within the space S1 is exhausted from the exhaust port 124, a pressure within the space S1 is lowered, so that a heat transfer from the inner pipe 123 to the outer pipe 121 via the space S1 is suppressed.

Referring back to FIG. 1, the processing system 100 is equipped with a plurality of exhaust lines 14, a plurality of valves 15, an exhaust device 16, a thermometer 17, a hygrometer 18, a temperature measuring device 19 and a control device 20. The exhaust port 124 of each heat insulating pipe 12 is connected to the exhaust device 16 via corresponding the exhaust line 14 and the corresponding valve 15. Opening/closing of the valve 15 and driving/stopping of the driving of the exhaust device 16 are controlled by the control device 20. As the gas within the space S1 of the heat insulating pipe 12 is exhausted via the exhaust line 14 by the exhaust device 16 with the valve 15 controlled to be in an open state, the pressure within the space S1 is lowered. If the pressure within the space S1 reaches a required pressure level, the valve 15 is turned into a closed state.

Here, even if the valve 15 is controlled to be in the closed state, a vacuum degree within the space S1 gradually decreases due to a gas generated from a member of the heat insulating pipe 12 directly contacting with the space S1, a gas leaking from the valve 15, and so forth. In case that the pressure within the space S1 increases to the extent that there is raised a concern that the condensation on the surface of the heat insulating pipe 12 may be generated, the control device 20 controls the gas within the space S1 to be exhausted, thus maintaining heat insulation property of the heat insulating pipe 12. The control device 20 is an example of a control unit.

Further, in the indoor space such as the clean room in which precision instruments are handled, a humidity as well as a temperature is managed to a preset value to suppress generation of static electricity. In case that the temperature and the humidity of the indoor space are managed to be, e.g., 25° C. and 60%, respectively, a dew-point temperature at which condensation occurs is about 16.7° C., which is only a difference of about 8° C. from a room temperature. Thus, in case of flowing a low-temperature coolant equal to or less than, e.g., −50° C. into the heat insulating pipe 12, it is important to maintain the heat insulation property of the heat insulating pipe high enough to suppress the condensation on the surface of the heat insulating pipe 12.

The thermometer 17 measures the temperature of the indoor space in which the heat insulating pipe 12 is placed. The hygrometer 18 measures the humidity of the indoor space in which the heat insulating pipe 12 is placed. The temperature measuring device 19 measures a temperature of the surface of the heat insulating pipe 12. In the present exemplary embodiment, the temperature measuring device 19 measures, in the surface of the heat insulating pipe 12, a temperature of a surface of the curved portion 125. For example, at the curved portion 125 which is bent with a bend radius R (hereinafter, referred to as "bending R"), the temperature measuring device 19 measures the temperature of the surface of the heat insulating pipe 12 opposite from a side of a center of the bending R. Here, the center of the bending R is, for example, a center of a circle including an arc formed by the bent heat insulating pipe 12.

In the present exemplary embodiment, the temperature measuring device 19 is a radiation thermometer using, for example, an infrared ray. Further, any of various other types of temperature sensors such as a thermocouple may be used as the temperature measuring device 19 as long as it is capable of measuring the temperature of the surface of the heat insulating pipe 12. The temperature measuring device 19 is an example of a first measuring unit; the thermometer 17, an example of a second measuring unit; and the hygrometer 18, an example of a third measuring unit.

The control device 20 determines whether the condensation on the heat insulating pipe 12 has occurred at each required timing (for example, every several hours to every several days). If it is determined that the condensation has occurred, the control device 20 operates the exhaust device 16, controls each valve 15 into the open state to lower the pressure within the space S1 of the heat insulating pipe 12. As a result, the heat insulation property of the heat insulating pipe 12 is recovered, so that the condensation on the heat insulating pipe 12 is suppressed.

To elaborate, the control device 20 acquires, at each required timing, temperature data measured by the thermometer 17 and humidity data measured by the hygrometer 18, and then, specifies the dew-point temperature of the surface of the heat insulating pipe 12 based on the acquired data. If the temperature of the surface of the heat insulating pipe 12 measured by the temperature measuring device 19 is lower than the specified dew-point temperature, the control device 20 controls each valve 15 and the exhaust device 16 to reduce the pressure within the space S1 of the heat insulating pipe 12.

Figure 3:
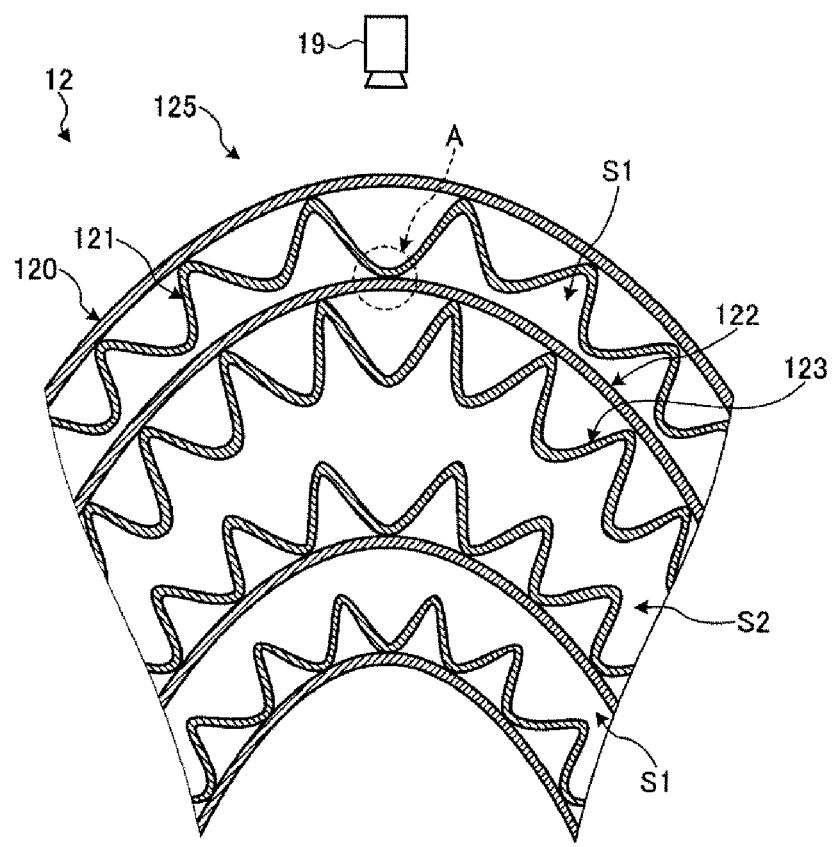
FIG. 3 is a cross sectional view illustrating an example of an internal state of the heat insulating pipe which is bent.

Here, it is assumed that the inside of the bent heat insulating pipe 12 is as illustrated in FIG. 3, for example. FIG. 3 is a cross sectional view illustrating an example of an internal state of the heat insulating pipe 12 which is bent. In case that the heat insulating pipe 12 is bent, a part of the outer pipe 121 and a part of the heat insulator 122 may come into contact with each other depending on a length of the bending R, as shown in FIG. 3. In the following, a contact portion between the outer pipe 121 and the heat insulator 122 may be referred to as a contact portion A. In this configuration, the outer pipe 121 may be cooled via the contact portion A by the influence of the low-temperature coolant flowing in the inner pipe 123, resulting in occurrence of the condensation on the surface of the pipe.

Figure 4:
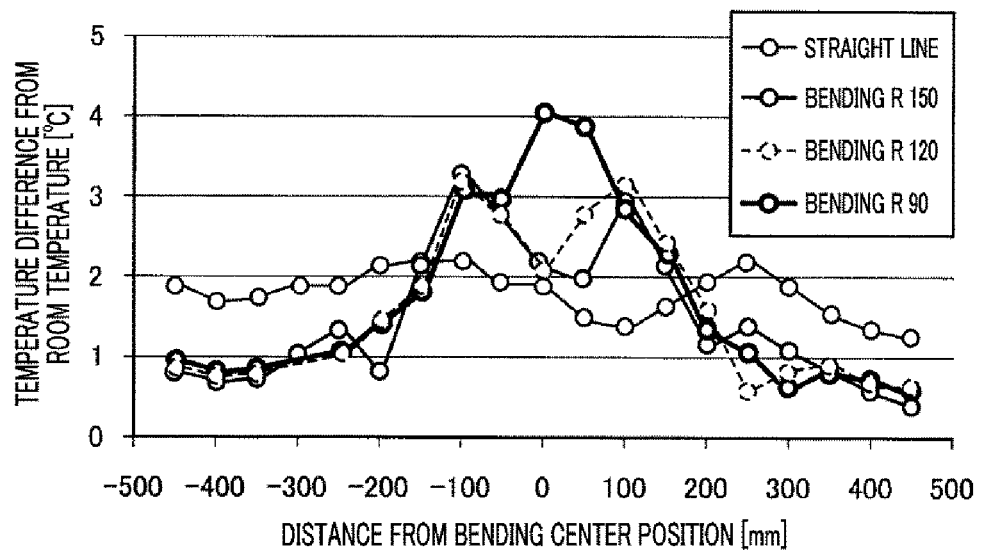
FIG. 4 is a diagram illustrating examples of a temperature difference between a room temperature and a temperature of a surface of the heat insulating pipe at each bending R.

FIG. 4 is a diagram illustrating an example of a temperature difference between the room temperature and the temperature of the surface of the heat insulating pipe 12 at each bending R. In FIG. 4, for each bending R, experimental data of the temperature difference between the room temperature and the temperature of the surface of the heat insulating pipe 12 opposite from the side of the center of the bending R are plotted at each distance from a bending center position. Here, the bending center position is, on the surface of the heat insulating pipe 12 opposite from the side of the center of the bending R, a middle position of the curved portion 125 formed by bending the heat insulating pipe 12.

For example, as shown in FIG. 4, the smaller the bending R is, the larger the temperature difference between the temperature of the bending center position and the room temperature is. It is deemed to be because the smaller the bending R is, the shorter a distance between the heat insulator 122 and the outer pipe 121 is, so that the heat insulation property through the space S1 is deteriorated.

Further, if the vacuum degree within the space S1 of the heat insulating pipe 12 is degraded, the heat insulation property of the entire space S1 is deteriorated. Therefore, the temperature difference shown in FIG. 4 is increased in an overall manner. As a result, if the vacuum degree within the space S1 of the heat insulating pipe 12 is degraded, the temperature of the surface of the heat insulating pipe 12 is also decreased. If the temperature of the surface of the heat insulating pipe 12 falls equal to or less than the dew-point temperature, the condensation on the surface of the heat insulating pipe 12 may take place.

By way of example, as depicted in FIG. 4, the temperature difference between the temperature of the surface of the heat insulating pipe 12 and the room temperature in the vicinity of the bending center position (for example, in a range of ±150 mm from the bending center position) is found to be larger than the temperature differences at the other positions. Thus, in the present exemplary embodiment, the temperature measuring device 19 measures the temperature in the vicinity of the bending center position of the bending portion 125 as the temperature of the surface of the heat insulating pipe 12. The control device 20 determines whether or not to exhaust the gas within the space S1 of the heat insulating pipe 12 by using the temperature in the vicinity of the bending center position and the dew-point temperature. Accordingly, the control device 20 is capable of suppressing the condensation on the surface of the heat insulating pipe 12 from suffering.

Furthermore, in the present exemplary embodiment, it is checked at each required timing whether the condensation on the surface of the heat insulating pipe 12 is generated, and, if it is found that the condensation on the heat insulating pipe 12 is generated, the gas within the space S1 of the heat insulating pipe 12 is exhausted. Therefore, even if a component having low airtightness or a material which easily generates a gas is used for the heat insulating pipe 12 and the valve 15, the condensation on the surface of the heat insulating pipe 12 can be suppressed if the frequency of the exhaust of the gas within the space S1 is increased. Therefore, cost of the processing system 100 can be cut.

[Configuration of Control Device 20]

Figure 5:
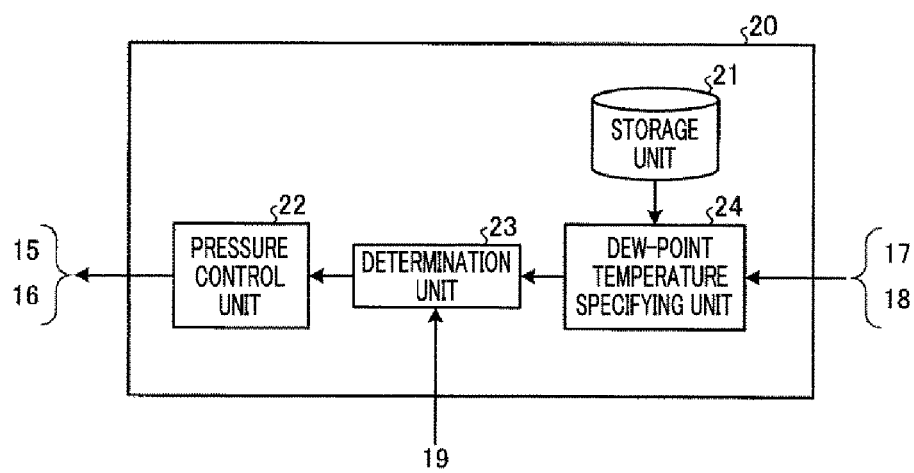
FIG. 5 is a block diagram illustrating an example of a control device according to the first exemplary embodiment.

FIG. 5 is a block diagram illustrating an example of the control device 20 according to the first exemplary embodiment. The control device 20 is equipped with a storage unit 21, a pressure control unit 22, a determination unit 23 and a dew-point temperature specifying unit 24. A dew-point temperature table 210 as shown in FIG. 6, for example, is previously stored in the storage unit 21. FIG. 6 is a diagram showing an example of the dew-point temperature table 210.

The dew-point temperature specifying unit 24 acquires the temperature data from the thermometer 17 and the humidity data from the hygrometer 18 at each required timing. Then, the dew-point temperature specifying unit 24 calculates, as an indoor temperature, a value obtained by adding a correction value based on a measurement error of the thermometer 17 to a temperature value measured by the thermometer 17. In the present exemplary embodiment, in case that the thermometer 17 has the measurement error of ±1° C., +1° C., which is the value of the measurement error corresponding to a case where the dew-point temperature becomes the highest, is added to the temperature value as the correction value.

Further, the dew-point temperature specifying unit 24 calculates, as an indoor humidity, a value obtained by adding a correction value based on a measurement error of the hygrometer 18 to a humidity value measured by the hydrometer 18. In the present exemplary embodiment, in case that the hygrometer 18 has the measurement error of ±10%, +10%, which is the value of the measurement error corresponding to a case where the dew-point temperature becomes the highest, is added to the humidity value as the correction value.

Furthermore, the dew-point temperature specifying unit 24 refers to the dew-point temperature table 210 within the storage unit 21, specifies a dew-point temperature corresponding to the corrected indoor temperature and the corrected indoor humidity, and outputs the specified dew-point temperature to the determination unit 23.

By way of example, as illustrated in FIG. 6, if the temperature value measured by the thermometer 17 is 24° C., the dew-point temperature specifying unit 24 outputs 25° C. as the corrected indoor temperature by adding the correction value of +1° C. based on the measurement error to the measured temperature value. Further, if the humidity value measured by the hygrometer 18 is 50%, the dew-point temperature specifying unit 24 outputs 60% as the corrected indoor humidity by adding the correction value of +10% based on the measurement error to the measured humidity value. Then, the dew-point temperature specifying unit 24 specifies the dew-point temperature of 16.7° C. corresponding to the corrected indoor temperature and the corrected indoor humidity by referring to the dew-point temperature table 210 within the storage unit 21.

The determination unit 23 acquires temperature data of the surface of the heat insulating pipe 12 from the temperature measuring device 19 if the dew-point temperature is outputted from the dew-point temperature specifying unit 24. Then, the determination unit 23 determines whether the temperature of the surface of the heat insulating pipe 12 is lower than the dew-point temperature specified by the dew-point temperature specifying unit 24. If the temperature of the surface of the heat insulating pipe 12 is lower than the dew-point temperature, the determination unit 23 instructs the pressure control unit 22 to exhaust the gas within the space S1.

Further, the determination unit 23 may obtain, as the temperature of the surface of the heat insulating pipe 12, a value which is obtained by adding the correction value based on the measurement error of the temperature by the temperature measuring device 19 to the surface temperature value acquired from the temperature measuring device 19, and compares this obtained value with the dew-point temperature. If the temperature measuring device 19 has the measurement error of ±1° C., −1° C., which is the value of the measurement error corresponding to a case where the surface temperature becomes the lowest, is added as the correction value to the surface temperature acquired from the temperature measuring device 19.

In response to the instruction from the determination unit 23 to exhaust the gas within the space S1 of the heat insulating pipe 12, the pressure control unit 22 operates the exhaust device 16 and turns each of the respective valves 15 into the open state. Then, if the inside of the space S1 of the heat insulating pipe 12 reaches a required vacuum degree, the pressure control unit 22 turns each of the respective valves 15 into the closed state and stops the operation of the exhaust device 16.

[Operation of the Control Device 20]

Figure 7:
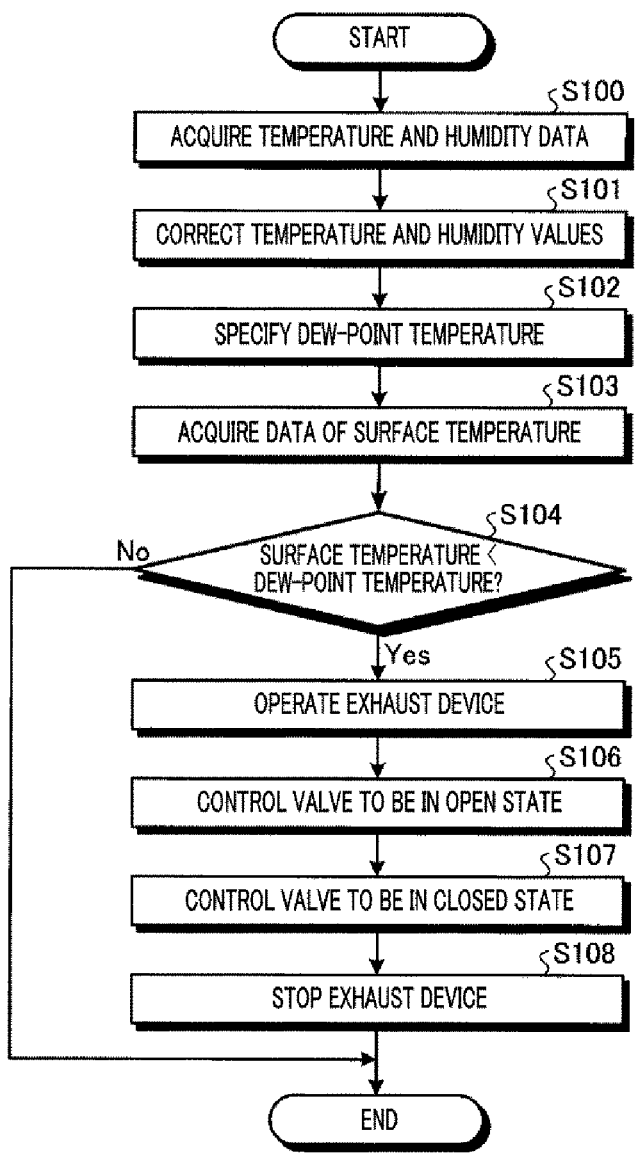
FIG. 7 is a flowchart illustrating an example of an operation of the control device in the first exemplary embodiment.

FIG. 7 is a flowchart illustrating an example of the operation of the control device 20 according to the first exemplary embodiment. The control device 20 performs the operation shown in this flowchart at each required timing (for example, every several hours to every several days).

First, the dew-point temperature specifying unit 24 acquires the temperature data from the thermometer 17 and the humidity data from the hygrometer 18 (S100). Then, the dew-point temperature specifying unit 24 corrects the temperature value measured by the thermometer 17 and the humidity value measured by the hygrometer 18 by adding the respective correction values to the temperature value and the humidity value (S101). Then, the dew-point temperature specifying unit 24 specifies the dew-point temperature corresponding to the corrected temperature value and the corrected humidity value by referring to the dew-point temperature table 210 within the storage unit 21 (S102).

Thereafter, the determination unit 23 acquires the temperature data of the surface of the heat insulating pipe 12 from the temperature measuring device 19 (S103). Then, the determination unit 23 determines whether the temperature of the surface of the heat insulating pipe 12 is lower than the dew-point temperature specified by the dew-point temperature specifying unit 24 (S104). If the temperature of the surface of the heat insulating pipe 12 is equal to or higher than the dew-point temperature (S104: No), the control device 20 terminates the operation shown in this flowchart.

Meanwhile, if the temperature of the surface of the heat insulating pipe 12 is lower than the dew-point temperature (S104: Yes), the determination unit 23 instructs the pressure control unit 22 to exhaust the gas within the space S1. After operating the exhaust device 16 (S105), the pressure control unit 22 controls each of the respective valves 15 to be turned into the open state (S106). Then, if the inside of the space S1 of the heat insulating pipe 12 reaches the required vacuum degree, the pressure control unit 22 controls each of the respective valves 15 to be turned into the closed state (S107), and stops the operation of the exhaust device 16 (S108). Then, the control device 20 terminates the operation shown in this flowchart.

So far, the first exemplary embodiment has been described. As clearly understood from the above explanation, the processing system 100 according to the present exemplary embodiment controls the vacuum degree in the space S1 within the heat insulating pipe 12 based on the temperature of the surface of the heat insulating pipe 12 and the dew-point temperature of the indoor space in which the heat insulating pipe 12 is placed. Accordingly, the condensation on the heat insulating pipe 12 can be suppressed.

Further, in the processing system 100 according to the above-described first exemplary embodiment, the temperature measuring device 19 measures the surface temperature of the bending center position of the curved portion 125 of the heat insulating pipe 12. However, the present disclosure is not limited thereto. Depending on the layout of the heat insulating pipe 12, it may be difficult to measure the temperature of the surface of the curved portion 125. In such a case, the temperature measuring device 19 may measure a surface temperature of the heat insulating pipe 12 at any available position thereof.

The temperature difference between the temperature of the surface of the heat insulating pipe 12 and the room temperature can be previously measured, though it differs depending on the distance from the bending center position, as illustrated in FIG. 4, for example. For the purpose, the control device 20 may estimate the temperature of the surface of the bending center position from the temperature of the surface of the heat insulating pipe 12 measured by the temperature measuring device 19 and compare the estimated temperature of the surface of the bending center position with the dew-point temperature.

By way of example, assume that the heat insulating pipe 12 is bent at the bending R of 90 mm and the temperature measuring device 19 measures the temperature of the surface of the heat insulating pipe 12 at a position spaced 250 mm apart from the bending center position. In the example of FIG. 4, the temperature difference at the position spaced 250 mm apart from the bending center position is smaller than the temperature difference at the bending center position by about 3° C. Accordingly, the control device 20 estimates, as the temperature of the bending center position, a temperature which is 3° C. lower than the temperature of the surface of the heat insulating pipe 12 measured by the temperature measuring device 19. Thus, the surface temperature of the bending center position can be estimated with high accuracy, and the degree of freedom in the measurement position by the temperature measuring device 19 can be improved. Further, the temperature difference between the surface temperature at the position of the heat insulating pipe 12 measured by the temperature measuring device 19 and the surface temperature at the bending center position is previously stored in, for example, the storage unit 21.

Second Exemplary Embodiment

In the processing system 100 according to the first exemplary embodiment, the exhaust device 32 configured to evacuate the processing chamber 10 and the exhaust device 16 configured to evacuate the space S1 of the heat insulating pipe 12 are separately provided. In a processing system 100 according to a second exemplary embodiment, however, a single exhaust device 32 is configured to evacuate both the processing chamber 10 and the space S1 of the heat insulating pipe 12. With this configuration, power consumption of the processing system 100 can be reduced.

[Configuration of Processing System 100]

Figure 8:
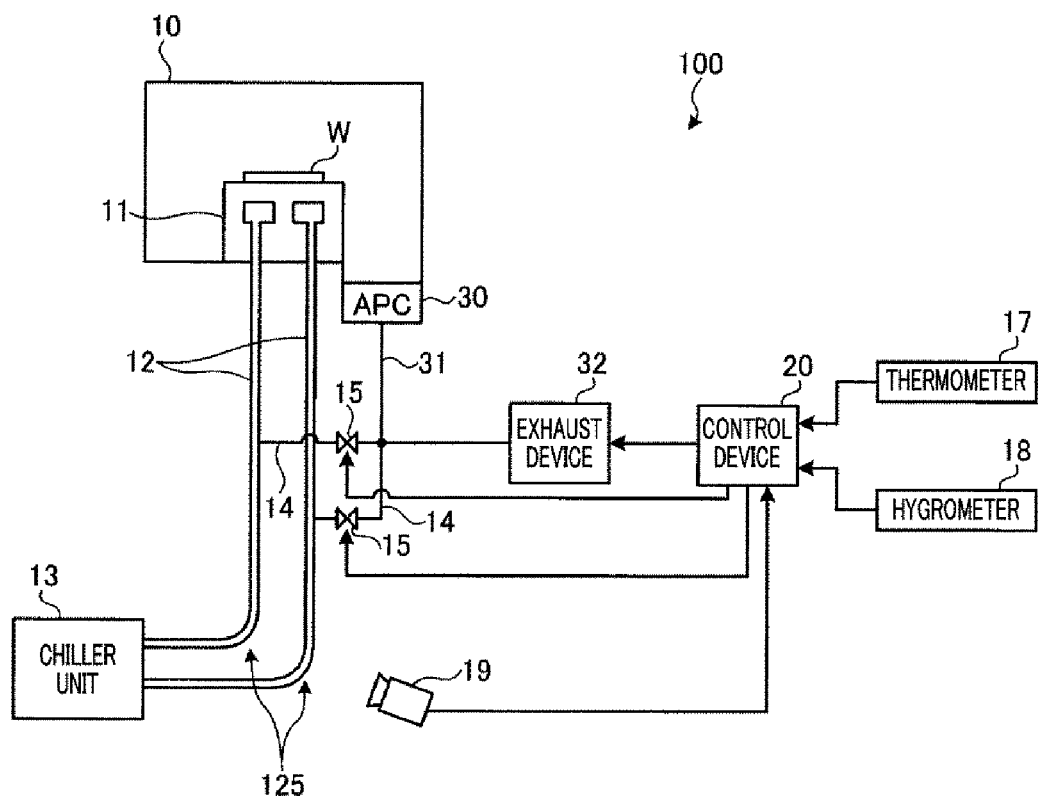
FIG. 8 is a diagram schematically illustrating an example of a processing system according to a second exemplary embodiment.

FIG. 8 is a diagram schematically illustrating the processing system 100 according to the second exemplary embodiment. Further, in FIG. 8, since parts assigned same reference numerals as those of FIG. 1 are the same as those of FIG. 1 except for the following, detailed description thereof will be omitted.

The exhaust port 124 of each heat insulating pipe 12 is connected to the exhaust device 32 via the exhaust line 14 and the valve 15. Opening/closing of the valve 15 and driving/stopping of the driving of the exhaust device 32 are controlled by the control device 20. In case of exhausting the gas within the space S1 of the heat insulating pipe 12, the control device 20 operates the exhaust device 32 and controls the valve 15 to be turned into an open state while an APC 30 is controlled to be in the closed state. If the inside of the space S1 reaches a required vacuum degree, the control device 20 controls the valve 15 to be turned into the closed state and stops the operation of the exhaust device 32.

By exhausting the gas within the space S1 of the heat insulating pipe 12 under the condition that the APC 30 is controlled to be in the closed state, the processing gas within the processing chamber 10 can be suppressed from back-flowing into the space S1 of the heat insulating pipe 12 via the exhaust line 31 and the exhaust line 14.

[Operation of Control Device 20]

Figure 9:
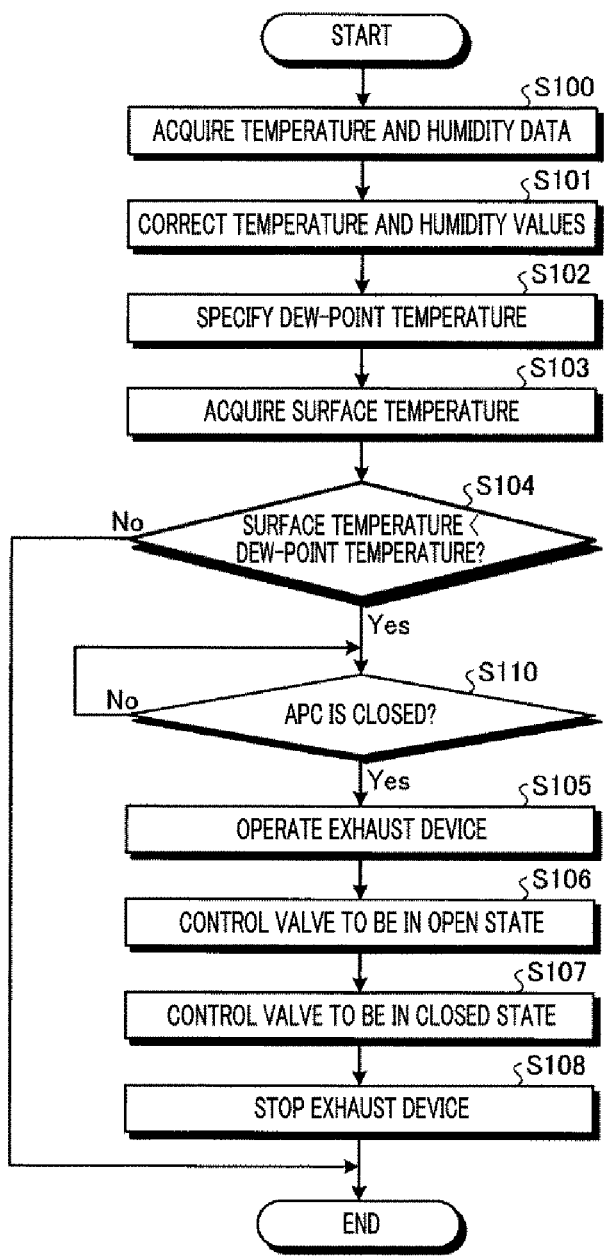
FIG. 9 is a flowchart for describing an example of an operation of a control device according to the second exemplary embodiment.

FIG. 9 is a flowchart illustrating an example of the operation of the control device 20 according to the second exemplary embodiment. The control device 20 performs the operation shown in this flowchart at a required timing (for example, every several hours to every several days). Further, in FIG. 9, processes assigned the same reference numerals as those of FIG. 7 are the same as the processes described in FIG. 7 except for the following, so detailed description thereof will be omitted.

If the temperature of the surface of the heat insulating pipe 12 is lower than the dew-point temperature (S104: Yes), the pressure control unit 22 determines whether the APC 30 is closed (S110). If the APC 30 is found not to be closed (S110: No), the pressure control unit 22 carries on the processing of the process S110 until the APC 30 is closed. In the present exemplary embodiment, control over the degree of openness of the APC 30 is performed by another functional block within the control device 20, and it is notified to the pressure control unit 22 from this functional block whether the APC 30 is closed or not. Further, the control over the degree of openness of the APC 30 may be controlled by another device provided separately from the control device 20 and it may be notified to the pressure control unit 22 from this another device whether the APC 30 is closed or not.

If the APC 30 is found to be closed (S110: Yes), the pressure control unit 22 operates the exhaust device 32 in a case that the exhaust device 32 is not being operated (S105), and controls each of the respective valves 15 to be turned into the open state (S106). If the inside of the space S1 of the heat insulating pipe 12 reaches a required vacuum degree, the pressure control unit 22 controls each of the respective valves 15 to be turned into the closed state (S107), and stops the operation of the exhaust device 32 (S108). Then, the control device 20 ends the operation shown in this flowchart.

So far, the second exemplary embodiment has been described. In the processing system 100 according to the second exemplary embodiment, as can be clearly understood from the above description, the evacuation of the space S1 of the heat insulating pipe 12 is performed by the exhaust device 32 which is also configured to evacuate the processing chamber 10. Accordingly, the condensation on the heat insulating pipe 12 can be suppressed, and the power consumption of the processing system 100 can be reduced.

Third Exemplary Embodiment

In the processing systems 100 according to the first exemplary embodiment and the second exemplary embodiment described above, it is determined whether or not to perform the exhaust of the gas within the space S1 of the heat insulating pipe 12 based on the temperature of the surface of the heat insulating pipe 12 measured by the temperature measuring device 19 and the dew-point temperature. However, in a processing system 100 according to a third exemplary embodiment, the gas within the space S1 of the heat insulating pipe 12 is exhausted, at each required timing, by the exhaust device 32 configured to evacuate the processing chamber 10. With this configuration, the thermometer 17, the hygrometer 18 and the temperature measuring device 19 are not necessary, so that the cost of the processing system 100 can be cut.

[Configuration of Processing System 100]

Figure 10:
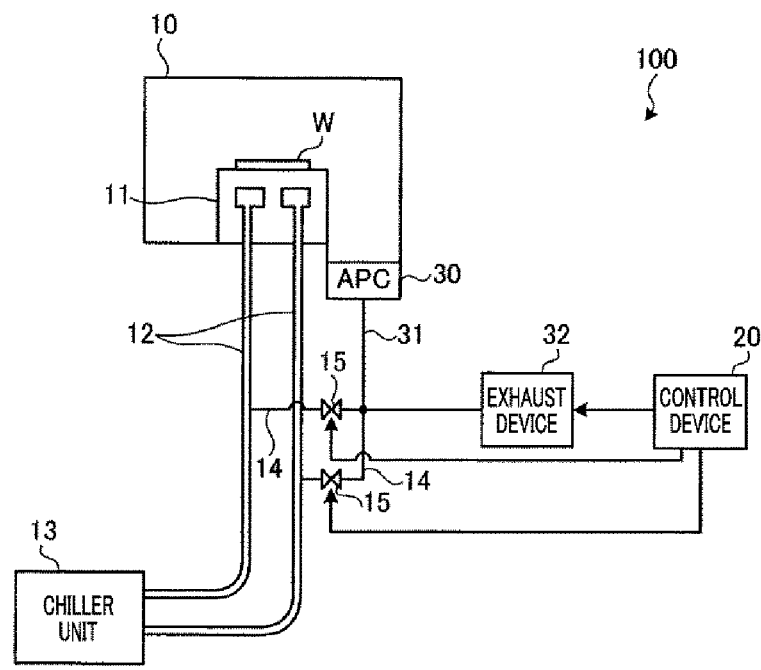
FIG. 10 is a diagram schematically illustrating an example of a processing system according to a third exemplary embodiment.

FIG. 10 is a diagram schematically illustrating an example of the processing system 100 according to the third exemplary embodiment. Further, in FIG. 10, since parts assigned same reference numerals as those of FIG. 8 are the same as those described in FIG. 8 except for the following, detailed description thereof will be omitted. The processing system 100 of the present exemplary embodiment is different from the processing system 100 of the second exemplary embodiment in that the thermometer 17, the hygrometer 18 and the temperature measuring device 19 are not provided.

The exhaust port 124 of each heat insulating pipe 12 is connected to the exhaust device 32 via the exhaust line 14 and the valve 15. Opening/closing of the valve 15 and driving/stopping of the driving of the exhaust device 32 are controlled by the control device 20.

[Configuration of Control Device 20]

Figure 11:
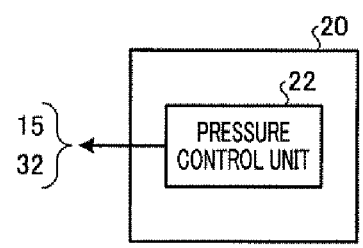
FIG. 11 is a block diagram illustrating an example of a control device according to the third exemplary embodiment.

FIG. 11 is a block diagram illustrating an example of the control device 20 according to the third exemplary embodiment. The control device 20 is equipped with the pressure control unit 22. At each required timing, the pressure control unit 22 operates the exhaust device 32 and controls the valve 15 to be turned into the open state under the condition that the APC 30 is controlled to be in the closed state, thus allowing the gas within the space S1 of the heat insulating pipe 12 to be exhausted. If the inside of the space S1 reaches a required vacuum degree, the pressure control unit 22 turns the valve 15 into the closed state and stops the operation of the exhaust device 32.

Further, a frequency of the exhaust of the gas within the space S1 of the heat insulating pipe 12 is set to be a time interval (for example, every several hours to every several days) shorter than a time required for the vacuum degree within the space S1 to be deteriorated to the extent that the condensation on the surface of the heat insulating pipe 12 is generated by a gas leaking from the valve 15 or the like or a gas generated from the inner pipe or the outer pipe of the heat insulating pipe after the gas within the space S1 is exhausted in a previous cycle.

[Operation of Control Device 20]

Figure 12:
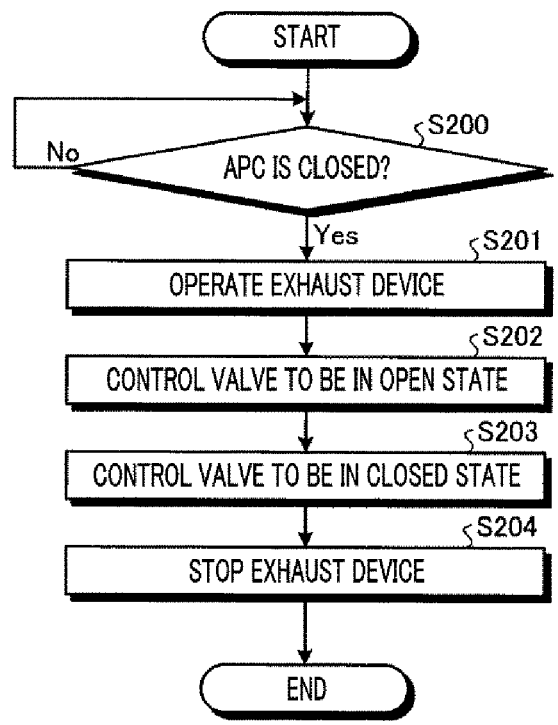
FIG. 12 is a flowchart for describing an example of an operation of the control device according to the third exemplary embodiment.

FIG. 12 is a flowchart illustrating an example of the operation of the control device 20 according to the third exemplary embodiment. The control device 20 performs the operation shown in this flowchart at each required timing (for example, every several hours to every several days)

First, the pressure control unit 22 determines whether the APC 30 is closed (S200). If the APC 30 is found not to be closed (S200: No), the pressure control unit 22 carries on the processing of a process S200 until the APC 30 is closed. If the APC 30 is found to be closed (S200: Yes), the pressure control unit 22 operates the exhaust device 32 in a case that the exhaust device 32 is not being operated (S201), and controls each of the respective valves 15 to be turned into the open state (S202). If the inside of the space S1 of the heat insulating pipe 12 reaches a required vacuum degree, the pressure control unit 22 controls each of the respective valves 15 to be turned into the closed state (S203), and stops the operation of the exhaust device 32 (S204). Then, the control device 20 ends the operation shown in this flowchart.

So far, the third exemplary embodiment has been described. As clearly understood from the above description, the processing system 100 according to the present exemplary embodiment does not include the thermometer 17, the hygrometer 18 and the temperature measuring device 19. Therefore, the condensation on the heat insulating pipe 12 can be suppressed, and manufacturing cost of the processing system 100 can be reduced.

[Hardware]

Figure 13:
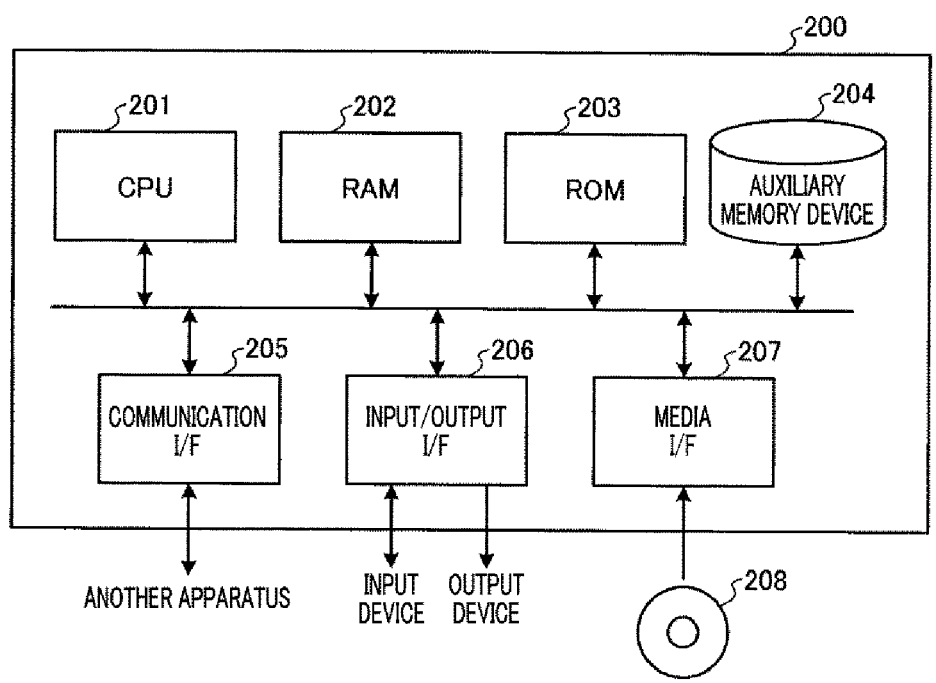
FIG. 13 is a hardware configuration view illustrating an example of a computer which implements a function of the control device.

Further, the control device 20 shown in the first exemplary embodiment to the third exemplary embodiment described above is implemented by a computer 200, as illustrated in FIG. 13, for example. FIG. 13 is a hardware configuration view illustrating an example of the computer 200 which implements the function of the control device 20. The computer 200 includes a CPU (Central Processing Unit) 201, a RAM (Random Access memory) 202, a ROM (Read Only Memory) 203, an auxiliary memory device 204, a communication interface (I/F) 205, an input/output interface (I/F) 206 and a media interface (I/F) 207.

The CPU 201 is operated based on a program stored in the ROM 203 or the auxiliary memory device 204, and controls individual components. The ROM 203 stores therein, for example, a boot program executed by the CPU 201 when the computer 200 is started or a program dependent on hardware of the computer 200.

The auxiliary memory device 204 includes, but not limited to, a HDD (Hard Disk Drive) or a SSD (Solid State Drive), and stores therein the program executed by the CPU 201, data used by this program, and so forth. The CPU 201 reads out this program from the auxiliary memory device 204, loads the read program on the CPU 201 and executes the loaded program.

The communication I/F 205 performs communications with other devices such as the valve 15 or the exhaust device 16 through a communication line such as a LAN (Local Area Network). The communication I/F 205 sends the CPU 201 data received from the devices through the communication line, and transmits data generated by the CPU 201 to the devices via the communication line.

The CPU 201 controls an input device such as a keyboard and an output device such as a display via the input/output I/F 206. The CPU 201 acquires, via the input/output I/F 206, data inputted by the input device. Further, the CPU 201 outputs generated data to the output device via the input/output I/F 206.

The media I/F 207 reads out a program or data stored in a recording medium 208 and stores the read program or data in the auxiliary memory device 204. By way of example, but not limitation, the recording medium 208 may be an optical recording medium such as a DVD (Digital Versatile Disc) or a PD (Phase change rewritable Disc), a magneto-optical recording medium such as a MO (Magneto-Optical disc), tape medium, a magnetic recording medium or a semiconductor memory.

The CPU 201 implements the individual functions of the pressure control unit 22, the determination unit 23 and the dew-point temperature specifying unit 24 by executing the program loaded on the RAM 202. Further, the data within the storage unit 21 is stored in the RAM 202 or the auxiliary memory device 204. Furthermore, though the CPU 201 executes the program read from the recording medium 208, the CPU 201 may acquire, as another example, the program from another device via a communication line and execute the received program.

[Others]

Here, it should be noted that the above-described exemplary embodiments are not limiting, and various changes and modifications may be made without departing from the scope of the present disclosure.

By way of example, in the above-described third exemplary embodiment, the gas within the space S1 of the heat insulating pipe 12 is exhausted at each required timing under the condition that the APC 30 is controlled to be in the closed state. If, however, the APC 30 is not in the closed state and a process is performed in the processing chamber 10 at a required timing, the control device 20 does not perform the exhaust of the gas within the space S1 of the heat insulating pipe 12 until the process is completed and the APC 30 is closed.

Thus, by referring to a schedule of processes managed by a managing device, the control device 20 determines whether or not a process is to be performed at a next timing when the exhaust of the gas within the space S1 of the heat insulating pipe 12 is performed. If a process is scheduled to be performed at the timing when the gas within the space S1 of the heat insulating pipe 12 is exhausted, the control device 20 may exhaust the gas within the space S1 of the heat insulating pipe 12 prior to starting the scheduled process.

Alternatively, if the process is scheduled to be performed at the subsequent timing when the gas within the space S1 of the heat insulating pipe 12 is exhausted, the control device 20 may change the timing for exhausting the gas within the space S1 of the heat insulating pipe 12 depending on whether a processing time of the scheduled process is equal to or longer than a predetermined time (for example, several hours).

By way of example, if the processing time of the scheduled process is less than the predetermined time, the control device 20 exhausts the gas within the space S1 of the heat insulating pipe 12 after the scheduled process is ended. Meanwhile, if the processing time of the scheduled process is equal to or longer than the predetermined time, the control device 20 exhausts the gas within the space S1 of the heat insulating pipe 12 before starting the scheduled process.

Still alternatively, whenever a process is performed, the control device 20 may perform the processing of exhausting the gas within the space S1 of the heat insulating pipe 12 as a pre-processing of the process.

Further, the above-descried exemplary embodiments have been described on the premise that at least a part of the heat insulating pipe 12 is bent when it is used. However, the exemplary embodiments are not limited thereto, and the disclosure of the exemplary embodiments may be applied to the heat insulating pipe 12 which is used without being bent.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting. The scope of the inventive concept is defined by the following claims and their equivalents rather than by the detailed description of the exemplary embodiments. It shall be understood that all modifications and embodiments conceived from the meaning and scope of the claims and their equivalents are included in the scope of the inventive concept.

We claim:

1. A heat insulating pipe system, comprising:
    a heat insulating pipe, having an inner pipe and an outer pipe, in which an airtight space is formed between the inner pipe and the outer pipe, a fluid having a temperature lower than a temperature of an indoor space in which the heat insulating pipe is placed being flown within the inner pipe;
    a first measuring unit configured to measure a temperature of a surface of the heat insulating pipe; and
    a control unit configured to control a pressure within the airtight space by controlling an exhaust device configured to exhaust a gas within the airtight space based on the temperature measured by the first measuring unit and a dew-point temperature calculated from a humidity and the temperature of the indoor space in which the heat insulating pipe is placed.

2. The heat insulating pipe system of claim 1,
    wherein the heat insulating pipe has a curved portion, and
    the first measuring unit measures the temperature of the surface of the heat insulating pipe in the vicinity of the curved portion.

3. The heat insulating pipe system of claim 2, further comprising:
    a second measuring unit configured to measure the temperature of the indoor space in which the heat insulating pipe is placed; and
    a third measuring unit configured to measure the humidity of the indoor space in which the heat insulating pipe is placed,
    wherein the control unit controls the pressure within the airtight space based on the temperature measured by the first measuring unit and a temperature which is obtained by adding, to the dew-point temperature, an error of the dew-point temperature caused by a measurement error of the temperature measured by the second measuring unit and a measurement error of the humidity measured by the third measuring unit.

4. The heat insulating pipe system of claim 3, further comprising:
    an exhaust line configured to connect the airtight space with the exhaust device; and
    a valve provided at the exhaust line,
    wherein the exhaust device exhausts a gas within a chamber accommodating therein a heat exchanging member configured to perform a heat exchange between the fluid supplied through the heat insulating pipe and a processing target substrate, and
    the control unit controls the pressure within the airtight space by controlling the exhaust device while controlling the valve to be in an open state.

5. The heat insulating pipe system of claim 2, further comprising:
    an exhaust line configured to connect the airtight space with the exhaust device; and
    a valve provided at the exhaust line,
    wherein the exhaust device exhausts a gas within a chamber accommodating therein a heat exchanging member configured to perform a heat exchange between the fluid supplied through the heat insulating pipe and a processing target substrate, and
    the control unit controls the pressure within the airtight space by controlling the exhaust device while controlling the valve to be in an open state.

6. The heat insulating pipe system of claim 1,
    wherein the heat insulating pipe has a curved portion,
    the first measuring unit measures the temperature of the surface of the heat insulating pipe at a preset position, and
    the control unit controls the pressure within the airtight space based on the temperature measured by the first measuring unit and a temperature which is obtained by adding, to the dew-point temperature, a temperature difference between the surface of the heat insulating pipe at the preset position where the temperature is measured by the first measuring unit and the surface of the heat insulating pipe at the curved portion.

7. The heat insulating pipe system of claim 6, further comprising:
a storage unit configured to store therein data of the temperature difference between the surface of the heat insulating pipe at the preset position where the temperature is measured by the first measuring unit and the surface of the heat insulating pipe at the curved portion,
wherein the control unit controls the pressure within the airtight space by using the data of the temperature difference acquired from the storage unit.

8. The heat insulating pipe system of claim 7, further comprising:
a second measuring unit configured to measure the temperature of the indoor space in which the heat insulating pipe is placed; and
a third measuring unit configured to measure the humidity of the indoor space in which the heat insulating pipe is placed,
wherein the control unit controls the pressure within the airtight space based on the temperature measured by the first measuring unit and a temperature which is obtained by adding, to the dew-point temperature, an error of the dew-point temperature caused by a measurement error of the temperature measured by the second measuring unit and a measurement error of the humidity measured by the third measuring unit.

9. The heat insulating pipe system of claim 8, further comprising:
an exhaust line configured to connect the airtight space with the exhaust device; and
a valve provided at the exhaust line,
wherein the exhaust device exhausts a gas within a chamber accommodating therein a heat exchanging member configured to perform a heat exchange between the fluid supplied through the heat insulating pipe and a processing target substrate, and
the control unit controls the pressure within the airtight space by controlling the exhaust device while controlling the valve to be in an open state.

10. The heat insulating pipe system of claim 7, further comprising:
an exhaust line configured to connect the airtight space with the exhaust device; and
a valve provided at the exhaust line,
wherein the exhaust device exhausts a gas within a chamber accommodating therein a heat exchanging member configured to perform a heat exchange between the fluid supplied through the heat insulating pipe and a processing target substrate, and
the control unit controls the pressure within the airtight space by controlling the exhaust device while controlling the valve to be in an open state.

11. The heat insulating pipe system of claim 6, further comprising:
a second measuring unit configured to measure the temperature of the indoor space in which the heat insulating pipe is placed; and
a third measuring unit configured to measure the humidity of the indoor space in which the heat insulating pipe is placed,
wherein the control unit controls the pressure within the airtight space based on the temperature measured by the first measuring unit and a temperature which is obtained by adding, to the dew-point temperature, an error of the dew-point temperature caused by a measurement error of the temperature measured by the second measuring unit and a measurement error of the humidity measured by the third measuring unit.

12. The heat insulating pipe system of claim 11, further comprising:
an exhaust line configured to connect the airtight space with the exhaust device; and
a valve provided at the exhaust line,
wherein the exhaust device exhausts a gas within a chamber accommodating therein a heat exchanging member configured to perform a heat exchange between the fluid supplied through the heat insulating pipe and a processing target substrate, and
the control unit controls the pressure within the airtight space by controlling the exhaust device while controlling the valve to be in an open state.

13. The heat insulating pipe system of claim 6, further comprising:
an exhaust line configured to connect the airtight space with the exhaust device; and
a valve provided at the exhaust line,
wherein the exhaust device exhausts a gas within a chamber accommodating therein a heat exchanging member configured to perform a heat exchange between the fluid supplied through the heat insulating pipe and a processing target substrate, and
the control unit controls the pressure within the airtight space by controlling the exhaust device while controlling the valve to be in an open state.

14. The heat insulating pipe system of claim 1, further comprising:
an exhaust line configured to connect the airtight space with the exhaust device; and
a valve provided at the exhaust line,
wherein the exhaust device exhausts a gas within a chamber accommodating therein a heat exchanging member configured to perform a heat exchange between the fluid supplied through the heat insulating pipe and a processing target substrate, and
the control unit controls the pressure within the airtight space by controlling the exhaust device while controlling the valve to be in an open state.

15. The heat insulating pipe system of claim 14,
wherein a pressure control valve is provided between the chamber and the exhaust device, and
when the pressure control valve is controlled to be in a closed state, the control unit controls the valve to be in the open state and controls the pressure within the airtight space by controlling the exhaust device.

16. A processing system, comprising:
an airtightly sealed chamber configured to perform a preset processing on a processing target substrate carried thereinto;
a heat exchanging member provided within the chamber and configured to perform a heat exchange between a fluid flowing therein and the processing target substrate;
a supply device configured to supply the fluid into the heat exchanging member;
a heat insulating pipe, connected between the heat exchanging member and the supply device, which has an inner pipe and an outer pipe and in which an airtight space is formed between the inner pipe and the outer pipe, and the fluid being flown within the inner pipe;

a measuring unit configured to measure a temperature of a surface of the heat insulating pipe;

an exhaust device configured to exhaust a gas within the airtight space; and a control unit configured to control a pressure within the airtight space by controlling the exhaust device based on the temperature measured by the measuring unit and a dew-point temperature calculated from a temperature and a humidity of an indoor space in which the heat insulating pipe is placed, wherein a temperature of the fluid is lower than the temperature of the indoor space in which the heat insulating pipe is placed.

17. A processing system, comprising:

an airtightly sealed chamber configured to perform a preset processing on a processing target substrate carried thereinto;

a heat exchanging member provided within the chamber and configured to perform a heat exchange between a fluid flowing therein and the processing target substrate;

a supply device configured to supply the fluid into the heat exchanging member;

an exhaust device configured to exhaust a gas within the chamber;

a heat insulating pipe, connected between the heat exchanging member and the supply device, which has an inner pipe and an outer pipe and in which an airtight space is formed between the inner pipe and the outer pipe, and the fluid being flown the inner pipe;

an exhaust line configured to connect the exhaust device with the airtight space of the heat insulating pipe;

a valve provided at the exhaust line; and a control unit configured to, at required timings, control the pressure within the airtight space by controlling the valve to be in an open state and exhausting a gas within the airtight space through the exhaust device, wherein a temperature of the fluid is lower than a temperature of an indoor space in which the heat insulating pipe is placed.

* * * * *